Dec. 6, 1960 H. S. BOONE 2,963,288
VEHICLE SUSPENSION SYSTEM
Filed Sept. 11, 1959 4 Sheets-Sheet 1
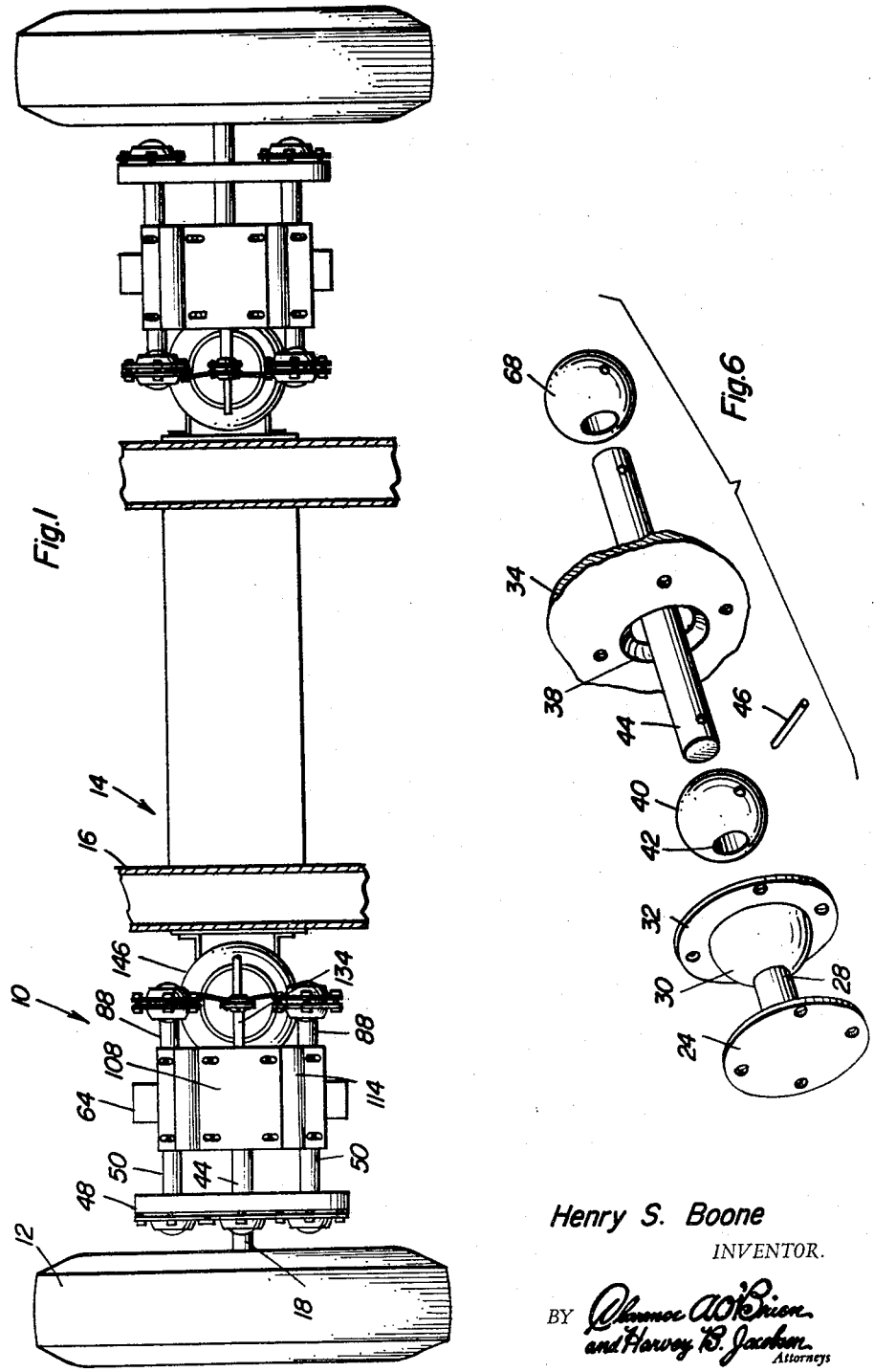
Henry S. Boone
INVENTOR.
BY *Clarence A. O'Brien*
*and Harvey B. Jacobson*
Attorneys Dec. 6, 1960  H. S. BOONE  2,963,288
VEHICLE SUSPENSION SYSTEM
Filed Sept. 11, 1959  4 Sheets-Sheet 2
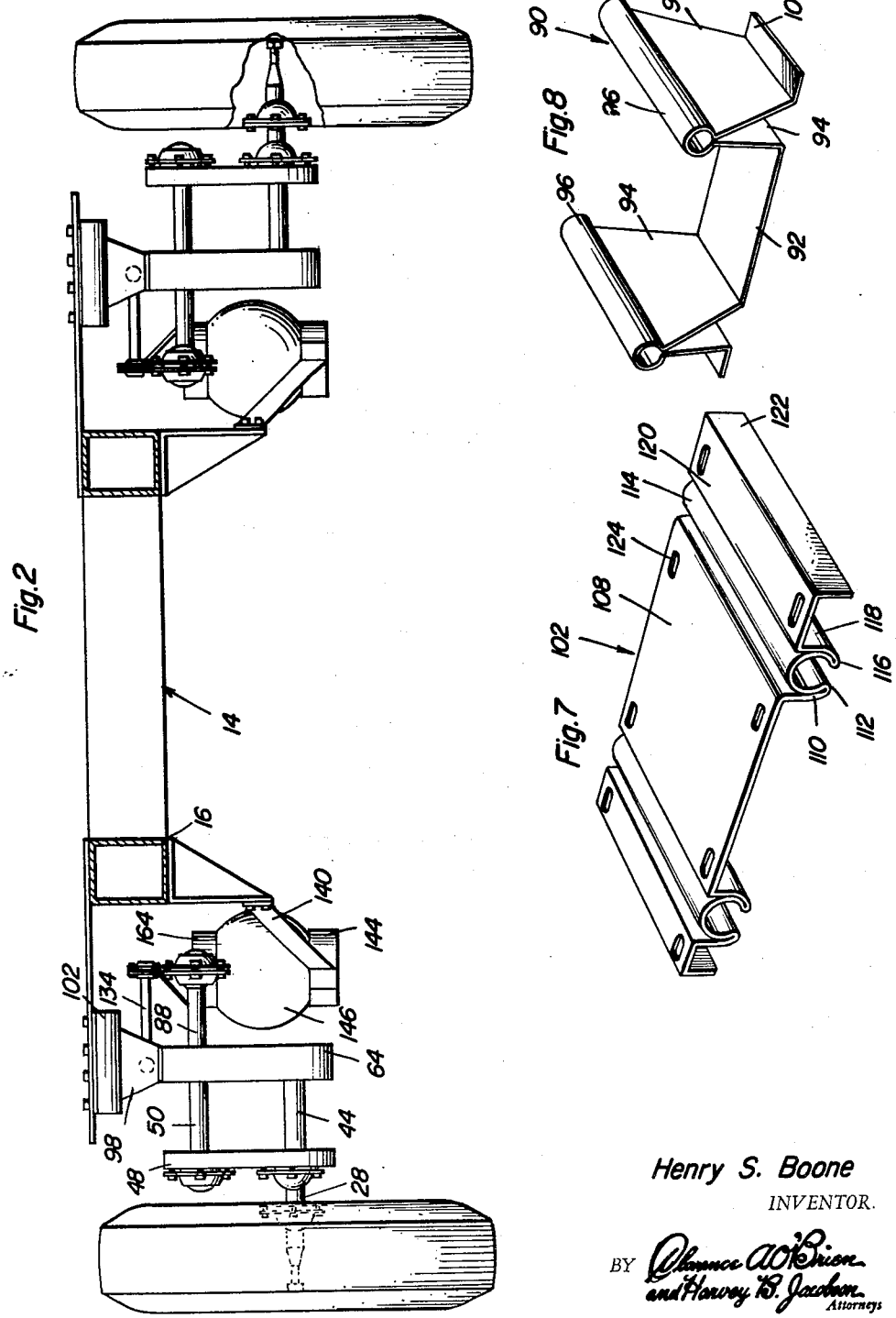
Henry S. Boone
INVENTOR.

Dec. 6, 1960  H. S. BOONE  2,963,288
VEHICLE SUSPENSION SYSTEM
Filed Sept. 11, 1959  4 Sheets-Sheet 3
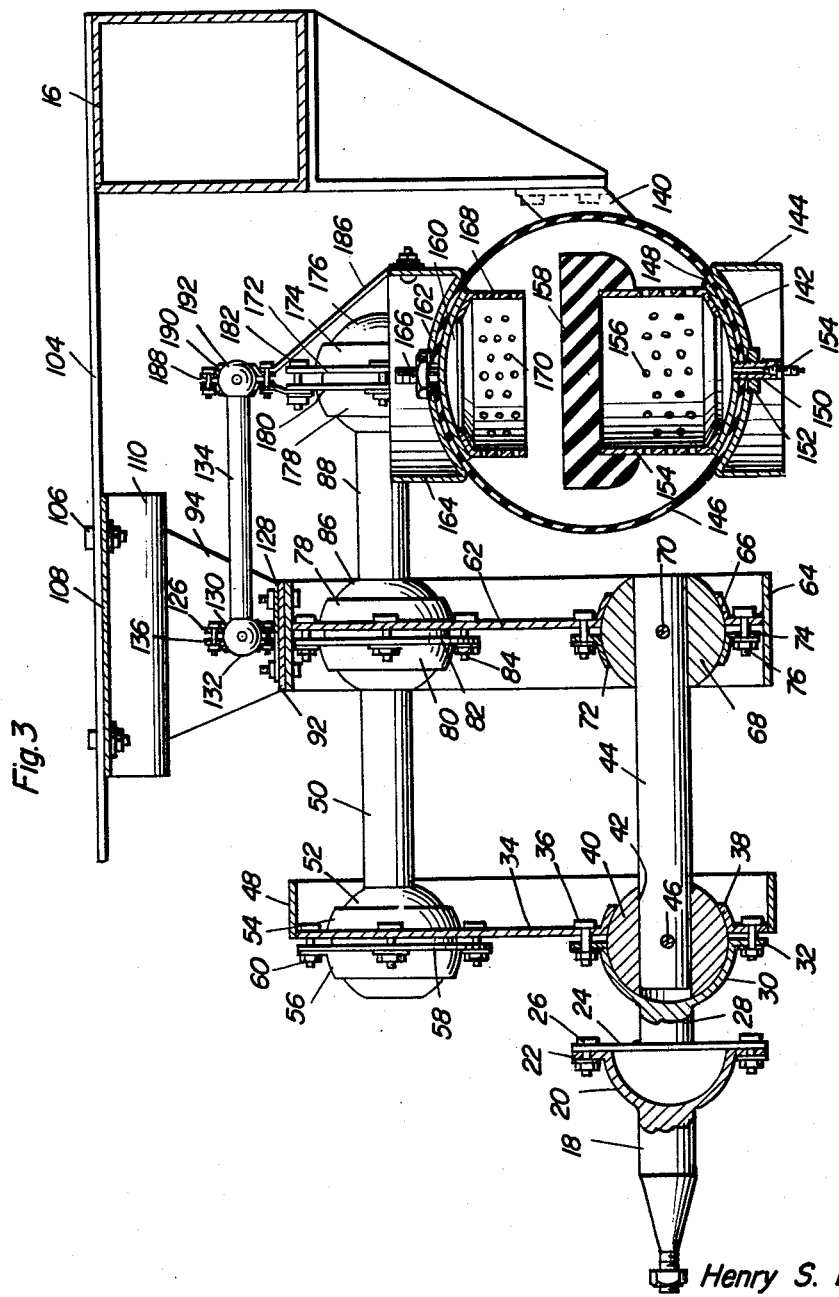
Henry S. Boone
INVENTOR.
BY Dec. 6, 1960  H. S. BOONE  2,963,288
VEHICLE SUSPENSION SYSTEM
Filed Sept. 11, 1959  4 Sheets-Sheet 4
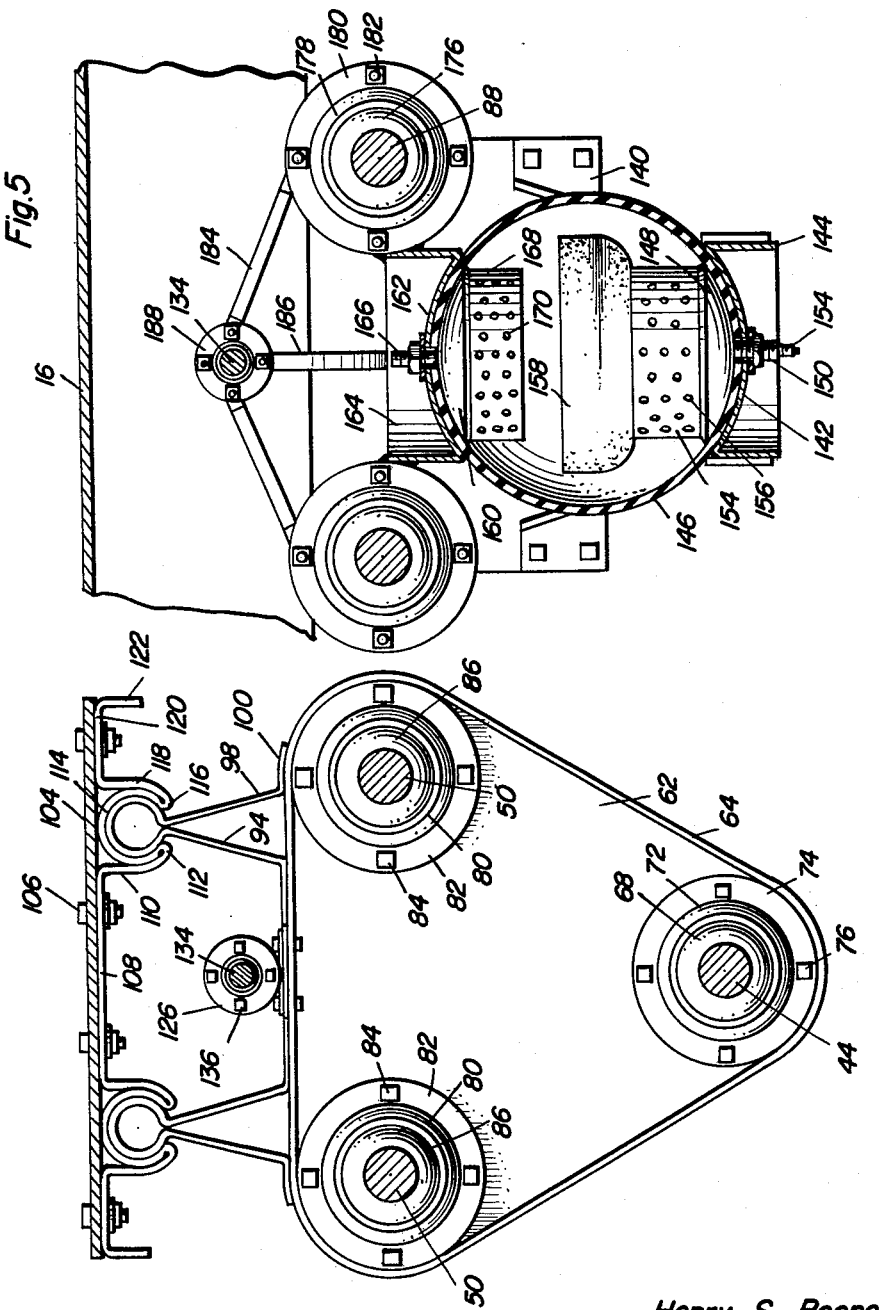
Henry S. Boone
INVENTOR.

United States Patent Office 2,963,288
Patented Dec. 6, 1960

2,963,288

VEHICLE SUSPENSION SYSTEM

Henry S. Boone, 1430 Beaumont Drive,
Montgomery, Ala.

Filed Sept. 11, 1959, Ser. No. 839,383

7 Claims. (Cl. 267—15)

The present invention generally relates to a suspension system for vehicular wheels, and more particularly to the suspension system of the steerable front wheels normally employed on road vehicles, although the device may be used for various installations in which relative movement of a supporting wheel in relation to a frame must be controlled.

The primary object of the present invention is to provide a vehicle wheel suspension in which the wheel is supported and maintained constantly in a vertical plane but which may move vertically in such vertical plane, move longitudinally while maintaining a vertical plane, and also move laterally inwardly and outwardly while maintaining a vertical plane.

In present-day automotive vehicle construction, a certain degree of movement of the vehicle wheels is permitted in relation to the frame, and such movement is controlled and cushioned by various devices such as coil springs, shock absorbers, pneumatic devices, hydraulic fluid devices, torsion devices, and the like. However, the degree of movement of the wheels is such that it is limited normally to movement in a single plane. For instance, the front wheel may move vertically while maintaining substantially a vertical plane but cannot move laterally inwardly and outwardly while maintaining the vertical plane and without moving in a vertical plane such as would occur when the conventional A-frame assembly is used as currently employed. Additionally, present-day construction does not permit fore and aft or longitudinal movement of the vehicle wheel while maintaining a vertical plane. Thus, while the present-day structure will compensate for movement of the wheel and absorb the forces exerted thereby when the wheel runs directly over an object and is elevated by the object, but when the wheel strikes an object from the side or partially from the side, the lateral force must be converted to a vertical force in order to be absorbed. Since the angular force will also have a component of horizontal force as well as vertical force, the horizontal or lateral component serves to move the vehicle wheel and the vehicle frame laterally or at least exert a lateral thrust thereon. This quite often results in loss of control of the vehicle and the subsequent dangerous condition which exists. Therefore, it is the primary object of the present invention to provide a structure which will permit the wheel to move laterally as well as longitudinally in relation to the vehicle frame when an object is engaged by the wheel with what may be termed a glancing blow, thereby preventing loss of control of the vehicle.

A further feature of the present invention is to provide a vehicle wheel suspension system in accordance with the preceding object in which the movement of the wheel in three directions is controlled and cushioned by the single cushioning device.

Another important object of the present invention is to provide a vehicle suspension device in accordance with the preceding object in which the cushioning means is in the form of a single spherical, inflated, resilient, flexible member having one end anchored to the frame and another end connected to a supporting linkage for the wheel whereby the cushioning device will cushion movement of the wheel supporting linkage in all of its directions of movement.

Yet another object of the present invention is to provide a cushioning device in accordance with the preceding object in which the cushioning device is novel in construction and provided with bumper or buffer blocks limiting the movement thereof in certain directions for limiting the scope of movement of the wheel.

Other features of the present invention will reside in its relative simplicity of construction, dependable, effective for its particular purposes and relatively easy to repair and maintain.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a schematic plan view of a vehicle frame with the suspension system of the present invention mounted thereon;

Figure 2 is a front view of the construction of Figure 1 illustrating the relationship of components of the invention;

Figure 3 is a transverse sectional view taken substantially through the center of the suspension system of one wheel illustrating the structural details and relationships thereof;

Figure 4 is a sectional view taken just inwardly of the sliding support plate mechanism illustrating the structure thereof;

Figure 5 is a sectional view of the cushioning member and its associated structure;

Figure 6 is an exploded group perspective view of the lower support member which supports the wheel carrying spindle;

Figure 7 is a perspective view of the supporting bracket for the slide; and

Figure 8 is a perspective view of the slide mechanism which engages the slide bracket and supports the main supporting slide plate.

Referring now specifically to the drawings, the numeral 10 generally designates the vehicle suspension system of the present invention which is employed for supporting the usual pneumatic vehicle ground-engaging wheels 12 of an automotive vehicle from a supporting frame generally designated by numeral 14 and including longitudinal frame rails 16. The details of the frame and the vehicle wheels are unimportant to the present invention except that the frame rails 16 are necessary for supporting the suspension system and the vehicle wheel 12 is rotatably journaled on the usual wheel spindle 18 by the usual bearings. The steering control mechanism for controlling pivotal movement of the front wheel 12 is not shown and may be of any suitable construction for pivoting the front wheel about a generally vertical axis normally provided by a king pin or the like incorporated into the spindle structure 18. For purposes of illustration, the spindle 18 is shown with a generally semi-spherical cup-shaped member 20 on the inner end thereof provided with a peripheral flange 22 that is attached to a plate 24 by bolts 26. The plate 24 is circular in configuration and is rigid with an extension shaft 28 having a semi-spherical cup-shaped member 30 on the inner end thereof which is provided with a peripheral flange 32 at the inner edge thereof. The cup-shaped member 20 and cup-shaped member 30 are duplicates of each other and the extension shaft 28 may be employed if necessary or may not be employed. It is desired to employ this extension shaft 28 in most installations in order to afford adequate room for movement of the vehicle wheel in relation to other stationary components, such as the wheel fenders and the like.

The extension shaft 28 is attached to an outer support plate 34 by virtue of fastening bolts 36 which extend through the plate 34 and through the flange 32. The plate 34 is provided with a partial spherical flange 38 in alignment with the cup-shaped member 30, and the flange 38 and cup-shaped member 30 coact to form an enlarged ball socket for a ball member 40 which is rotatably mounted therein and provided with a central bore 42 receiving a shaft 44 which is secured to the ball 40 by a transverse pin 46. The ball 40 is universally rockably connected to the plate 44 by virtue of the partial spherical flange 38 engaging the ball on one side of the transverse center thereof and the cup-shaped member 30 engaging the ball on the other side of the center thereof, with the bolts 36 securing the ball 40 detachably in the socket whereby the shaft 44 will be universally connected to the support plate 34.

The outer support plate 34 is provided with a peripheral laterally extending flange 48 for reinforcing the plate member 34 and rigidifying the same. The outer support plate 34 is substantially triangular in configuration with the apex of the triangle being disposed downwardly, with the ball member 40 being received therein.

The upper portion of the plate 34 is connected with a pair of similar shafts 50 which have a ball member 52 on the outer end thereof, with the ball member 52 being engaged on one side of the center thereof by a partial spherical flange 54 integral with the plate 34 which is similar to the flange 38 and the other portion of the ball 32 being engaged by a partial spherical cup-shaped member 56 having a peripheral flange 58 secured to plate member 34 by bolts 60 whereby the ball member 52 and the shaft 50 connected thereto are connected to the outer support plate 34 for universal movement. The two shafts 50 are in horizontal, parallel relationship and, as seen in Figure 1, they are disposed outwardly of the lower shaft 44.

Disposed inwardly of and parallel to the outer supported plate 34 is an inner supporting plate or slide plate 62 which is also of triangular configuration with the apex thereof disposed downwardly with the plate 62 having a peripheral flange 64 extending laterally to both sides thereof for reinforcement and strengthening purposes. The apex of the plate member 62 is provided with a partial spherical flange 66 similar to the flange 38 for receiving a ball member 68 attached to the end of the shaft 44 by a transverse pin 70. The ball 68 is held in seated relation to the partial socket formed by the partial spherical flange 66 by virtue of a removable partial spherical flange 72 having a peripheral flange 74 connected thereto which is secured to the plate member 62 by volts 76, thereby capturing the ball member 68 in relation to the plate 62 but permitting universal pivotal movement of the shaft 44 in relation to the plate 62.

The upper, outer corners of the plate 62 are each provided with a partial flange 78 equivalent to the flange 64 on the plate 34 and also a flange 80 of partial spherical shape equivalent to the flange 56 that is provided with a peripheral flange 82 secured to the plate member 62 by volts 84, thereby receiving and universally retaining a ball 86 in the partial socket, with the ball 86 being mounted on the shaft 50 which extends beyond the plate 62 inwardly towards the frame 16 with this portion of each of the shafts 50 being designated by numeral 88 although the portion designated by numeral 50 in Figure 3 and the portion designated by 88 are actually integral one-piece construction.

The top portion of the flange 64 which extends across the top edge of the support plate 62 is connected to a slide member, generally designated by numeral 90, which includes a bottom plate 92 which is horizontally disposed and secured against the flange 64 such as by welding or bolting. The outer ends of the plate 92 extend upwardly and outwardly in substantially a vertical direction with the upstanding end portions being designated by numeral 94. The upstanding end portions 94 terminate in substantially elongated cylindrical members 96 formed integrally with the upstanding end portions 94. Formed integrally with the edges of the cylindrical portions 96 are depending and outwardly diverging plate members 98 terminating in outwardly extending lugs 100 which are also secured to the upper portion of the flange 64 as illustrated in Figure 4. The cylindrical members or portions 96 slidingly engage a slide bracket generally designated by numeral 102 and supports the slide support plate 62 from a plate 104 connected to the frame member 16, with the bracket 102 being connected to the supporting plate 104 by bolts 106. The slide bracket 102 includes a central horizontal plate member 108 having a depending and slightly outwardly curved end portion 110 terminating in an outwardly extending reverse bend 112 having a cylindrical portion 114 extending from the reverse bend and a second reverse bend 116 is disposed in facing relation to the reverse bend 116 whereby the reverse bends will receive the cylindrical member 96 with the reverse bends 112 and 116 being spaced sufficiently for receiving the portions 94 and 98 therebetween, as illustrated in Figure 4. Extending upwardly and against the periphery of the cylindrical member 114 for reinforcement thereof is the upwardly curved and outwardly extending plate 118 comparable to portion 110. The plate 118 terminates in a horizontal plate 120 having a depending end portion 122. The plate 108 and the plates 120 are each providing with slot-like openings 124 for receiving the fastening bolts 106 whereby the longitudinal position of the slide bracket 102 in relation to the vehicle may be adjusted. The cylindrical members 114 and 96 are disposed transversely of the vehicle or in perpendicular relation to the longitudinal axis of the longitudinal frame rail 16 so that the slide support plate 62 may move horizontally inwardly and outwardly in relation to the frame rail 16 as guided and supported by the cylindrical members 114 which form guide sleeves or rails for the sleeves or cylindrical portions 96.

Disposed centrally of the plate 92 is a pair of upstanding plates 126 having outturned lugs 128 on the lower end thereof which are secured to the flange 64 by suitable bolts or the like. Each of the plates 126 is provided with a partial spherical, outwardly extending flange 130 for engagement with a ball 132 on the end of a rod 134. The plates 126 are pulled towards each other by bolts 136 for securing the ball member 132 in position and permitting universal movement of the arm or rod 134 in relation to the plate 62. The arm 134 is disposed intermediate the shafts 88 and act somewhat as a stabilizer for controlling the movement of the slide fixture 90 in relation to the slide bracket.

Supported from the frame rail 16 is a bracket 140 having a concave lower portion 142 with a depending peripheral flange 144. Disposed against the surface of the concave portion 142 is an inflatable, flexible, resilient, spherical ball member 146 which has an internal, partial spherical, rigid plate 148, with there being a screw-threaded element 150 extending through and connected to the plate 148 and through the plate 142 with a screw-threaded nut 152 being used for clamping the plates 148 and 142 together. The threaded stud 150 is hollow and provided with an air valve 154 such as a conventional check valve employed in pneumatic tire structures, so that the spherical, resilient, flexible member 146 may be easily inflated.

Attached to the member 148 is an upstanding cylindrical member 154 having a plurality of apertures 156 thereon and having a bumper or closure 158 on the upper end thereof which is of sponge or foam material or of rubber material for cushioning the downward movement of the upper portion of the spherical ball 146 which is also provided with an inner plate 160 and an outer plate 162 having a peripheral, upwardly extending flange 164. A bolt assembly 166 holds the inner plate and outer plate rigidly together, and a cylindrical depending projection 168 is provided on the inner plate 160 and is also provided with a plurality of apertures 170 which permit escape of air and also permit collapsing of the spherical member 146 within the confines defined by the internal structure of the spherical member 146.

Attached to each side of the upstanding flange 164 is an annular flange 172 which carries a partial spherical flange 174 for receiving a ball member 176. The flange 174 engages the ball member 176 outwardly of the center thereof while a similar partial spherical flange 178 engages the ball adjacent the inner end thereof and on the opposite side of the center from the flange 174. The flange 178 is provided with a peripheral flange 180, and bolts 182 hold the flanges 180 and 172 together, thus capturing the ball member 176 for universal movement in relation to the flange 164, outer plate 162 and the upper portion of the spherical hollow ball 146. There are two ball members 176 and they are mounted on the outer ends of shafts 88, respectively.

Extending upwardly from the flanges 180 and particularly from the uppermost bolt 182 is a strap 184 with there being two straps extending toward each other. Also, an upwardly extending strap 186 extends upwardly from the inner portion of the flange 164 as shown in Figure 3. The straps are secured to a pair of plates 188, each of which is provided with a partial spherical flange 190 engaging the opposite sides of a ball member 192 on the inner end of the control arm 134, thus securing the inner end of the arm 134 to the flange 164 and supporting the arm 134 in parallel relation to the shafts 88.

In practical operation of the invention, the wheel may move laterally inwardly and outwardly as controlled by the slide supporting plate 62 and the slide bracket 102 when a lateral thrust is imparted to the wheel. Such movement is cushioned and restricted by the connection between the inner ends of the shafts 88 and the upper end of the spherical hollow member 146. Upward and downward movement of the wheel is accomplished by the shaft 44 and shaft 50 with the extension 88 as being in the nature of a pivotal parallelogram, with the upward or downward movement of the wheel being resisted by compression or extension of the hollow spherical member 146. When the spindle 18 is moved longitudinally, the triangular orientation of the shafts 44 and 50 will still cause all of the shafts to move in the same rearwardly and forwardly arcuate swinging path, with the ball members 68 and 86 defining fulcrum points for the mechanism, with the mechanism being a pivotal parallelogram type of arrangement.

The buffer or bumper 158 will limit the movement of the spherical member 146 in at least a direction that moves the tops and bottoms of the spherical member 146 together. The pressure placed in the spherical member or an air supply may be variable with the higher pressures, providing for a stiffer control, and lower pressures permitting more variation in the characteristics of the ball as far as its suspension and cushioning qualities are concerned.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A vehicle wheel suspension comprising the combination of a frame, a vehicle wheel, a support member rotatably supporting the wheel, and means interconnecting the support member and the frame for providing lateral inward and outward movement of the wheel, vertical movement of the wheel, and longitudinal movement of the wheel in relation to the frame, said means including cushioning and control means for limiting and cushioning the movement of the wheel in all directions, said cushioning and control means including an inflatable, spherical, resilient member having one portion thereof connected with the frame, the other portion of the member being connected with said means for supporting the wheel support from the frame, said means for supporting the wheel support including a slide plate, means mounting the slide plate on the frame for lateral horizontal movement, a pair of shafts extending through the slide plate and connected thereto for universal relative movement to the slide plate, one end of the shafts being universally connected to the resilient member and the other end of the shafts being universally connected to the support member for the wheel, and a shaft extending between the slide plate and the support member in spaced parallel relation to the pair of shafts and being universally connected at its respective ends to the support member and the slide plate for maintaining the slide plate and the support member in parallel relation, the universal connection between the sliding plate and the pair of shafts providing for movement of the support member in any direction with the connection between the inner ends of the pair of shafts and the resilient member permitting relative movement of the support member as cushioned by the inflated member.

2. The structure as defined in claim 1 wherein said hollow resilient member is provided with a resilient bumper interiorly thereof for limiting the scope of movement of the support member.

3. A vehicle wheel suspension comprising a frame member, a wheel supporting member, a pair of arms each with one end universally pivotally connected to said wheel supporting member, a support plate supported from the frame member and universally pivotally supporting an intermediate portion of said arms, resilient means interconnecting the other ends of said arms and said frame member for cushioning movement of said arms in all directions in relation to the frame member, and a shaft interconnecting the wheel supporting member and the support plate with the ends thereof universally connected to the plate and wheel supporting member and cooperating with the pair of arms for maintaining the support plate and wheel supporting member in parallel relation during movement of the wheel supporting member, said resilient means cushioning the movement of said wheel supporting member in relation to the frame member.

4. The combination of claim 3 wherein said frame member includes a horizontally disposed slide plate slidably supporting said support plate for lateral movement in relation to the frame member, and a rod universally pivotally connected to the support plate and the resilient means for controlling the movement of the support plate.

5. The combination of claim 3 wherein said resilient means includes a hollow spherical member, means in said spherical member for admitting and releasing air pressure for varying the cushioning characteristics thereof.

6. The combination of claim 5 wherein said spherical member is provided with a bumper interiorly thereof for limiting the deflection of the spherical member.

7. The combination of claim 6 wherein said frame member includes a horizontally disposed slide plate slidably supporting said support plate for lateral movement in relation to the frame member, and a rod universally pivotally connected to the support plate and the resilient means for controlling the movement of the support plate.

References Cited in the file of this patent

UNITED STATES PATENTS

| | | |
|---|---|---|
| 1,555,199 | Gouirand | Sept. 29, 1925 |
| 2,305,795 | Schieferstein | Dec. 22, 1942 |
| 2,344,072 | Winkelmann | Mar. 14, 1944 |
| 2,344,380 | Wilfert et al. | Mar. 14, 1944 |
| 2,496,893 | Smith | Feb. 7, 1950 |

FOREIGN PATENTS

| | | |
|---|---|---|
| 428,664 | Great Britain | May 16, 1935 |